(12) United States Patent
Mainiero (10) Patent No.: US 11,572,814 B2
(45) Date of Patent: Feb. 7, 2023

(54) BREATHER/CHECK VALVE OIL AND AIR SEPARATOR SYSTEM AND METHOD

(71) Applicant: Joe Mainiero, Lake Worth, FL (US)

(72) Inventor: Joe Mainiero, Lake Worth, FL (US)

( * ) Notice: Subject to any disclaimer, the term of this patent is extended or adjusted under 35 U.S.C. 154(b) by 211 days.

(21) Appl. No.: 16/998,026

(22) Filed: Aug. 20, 2020

(65) Prior Publication Data

US 2022/0056825 A1 Feb. 24, 2022

(51) Int. Cl.
| | | |
|---|---|---|
| F01M 13/00 | (2006.01) | |
| F01M 13/04 | (2006.01) | |
| B01D 46/00 | (2022.01) | |
| B01D 46/12 | (2022.01) | |

(52) U.S. Cl.
CPC ..... *F01M 13/0011* (2013.01); *B01D 46/0031* (2013.01); *B01D 46/12* (2013.01); *F01M 13/04* (2013.01); *B01D 2279/60* (2013.01)

(58) Field of Classification Search
CPC ............... F01M 13/0011; F01M 13/04; B01D 46/0031; B01D 46/12; B01D 2279/60
See application file for complete search history.

(56) References Cited

U.S. PATENT DOCUMENTS

| | | | | |
|---|---|---|---|---|
| 5,201,301 A * | 4/1993 | Re | ........................ | F01M 13/022 |
| | | | | 123/573 |
| 5,564,401 A * | 10/1996 | Dickson | ................ | F01M 13/023 |
| | | | | 123/573 |
| 5,853,439 A * | 12/1998 | Gieseke | .............. | B01D 46/2411 |
| | | | | 55/330 |
| 8,714,142 B2 * | 5/2014 | Jacob | .................. | B01D 46/0087 |
| | | | | 123/573 |
| 2005/0211232 A1* | 9/2005 | Dushek | ................ | F16K 17/0453 |
| | | | | 123/574 |
| 2008/0142426 A1* | 6/2008 | Greco | ................... | B01D 35/143 |
| | | | | 210/234 |
| 2009/0183717 A1* | 7/2009 | Gillenberg | ............. | F01M 13/04 |
| | | | | 123/573 |
| 2010/0031940 A1* | 2/2010 | Mosset | .............. | B01D 46/2414 |
| | | | | 123/573 |
| 2011/0258975 A1* | 10/2011 | Lundgren | .......... | B01D 46/0031 |
| | | | | 55/357 |
| 2018/0306077 A1* | 10/2018 | Mainiero | .......... | F02M 35/10222 |
| 2019/0178123 A1* | 6/2019 | Mainiero | ........... | F01M 13/0011 |

* cited by examiner

*Primary Examiner* — Hung Q Nguyen
(74) *Attorney, Agent, or Firm* — Uradrik Law Firm PC (57) ABSTRACT

An oil and air separator including a catch can with an inlet and an outlet thereto, the catch can adapted to remove oil from vapors entering the catch can via the inlet, and including an internal reservoir within which oil from the vapors entering the catch can may collect; and a check valve including a first end disposed within the internal reservoir, a second end, and a first fluid pathway therebetween in fluid communication with the internal reservoir, wherein vapors within the internal reservoir may exit the catch can through the first fluid pathway or a second fluid pathway including the outlet.

12 Claims, 14 Drawing Sheets

BREATHER/CHECK VALVE OIL AND AIR SEPARATOR SYSTEM AND METHOD

FIELD OF THE DISCLOSURE

The invention relates generally in one embodiment to the removal of crankcase oil from one or more exit airstreams from a crankcase of an internal combustion engine, and more particularly to the use of an oil and air separator including a breather and check valve combination.

BACKGROUND

In a combustion engine, blow-by gases typically include unburned gasoline, oil, sulfur, acids, and other impurities. That is, an amount of air and unburned gasoline and other impurities from the engine cylinder is pulled past the piston rings and into the crankcase.

In one instance, blow-by gases might be exhausted to the atmosphere through a breather system coupled directly to an engine oil fill port. In another instance, instead of exhausting blow-by gases to the atmosphere, a positive crankcase ventilation (PCV) system recycles the blow-by gases through a PCV valve into the engine's intake manifold. Such recycling occurs when the engine is operating at relatively slow speeds (e.g. idling), i.e., when the air pressure in the crankcase is higher than the air pressure in the intake manifold.

One problem associated with breather systems and PCV systems and their use involves oil vapors. An engine's crankcase is used to store oil. A pan located below the crankshaft holds oil, and generally oil vapors from the oil in the pan may find their way into the blow-by gases.

In a combustion engine, crankcase breathers have been used as a replacement for an engine oil fill cap. A crankcase breather creates a fluid pathway for engine combustion gases to travel through the engine oil fill port and through the crankcase breather to the atmosphere. The crankcase breather may include a means for filtering oil from the combustion gases. However, a problem exists in that the filter means allows oil to blow all over in the engine bay, creating a huge mess. Control of the oil from the exhaust gases is unmanageable. There is no way to prevent the escape of oil to the environment, and no way to prevent undesirable oil dripping (e.g., onto driveways, garage floors).

It is also undesirable for oil to be recycled with blow-by gases into an engine's intake manifold. Such recycled oil may degrade engine performance by lowering the overall octane of the combustion mixture in a cylinder. Such recycled oil also may coat the air intake and prevent airflow. To help combat the presence of oil in blow-by gases, "dirty-side" oil and air separators were developed to remove the oil from the blow-by gases before recirculation through the PCV valve and into the intake manifold. However, when the air pressure in the crankcase is higher than the air pressure in the intake manifold, it is also possible that blow-by gases will travel upstream (or backwards) into the "clean-side" assembly that leads from the PCV valve to the intake manifold.

There are various different models or types of oil and air separators available. One popular type of oil and air separator involves passing oily blow-by gases through a filter material. The oil collects in droplets on the filter material, which may be held in place by a screen. The oil is allowed to drop into the bottom of a can where the oil collects for later removal. This "can approach" to oil and air separation is not without its drawbacks, however.

SUMMARY

The present disclosure in one embodiment provides oil and air separation systems and methods. In one exemplary embodiment, an oil and air separator includes: (a) a first housing including a central chamber therein, the central chamber divided into a first inner portion and a second outer portion by a barrier; (b) a screen and/or filter material disposed between the first inner portion and the second outer portion; (c) a cap directly removably coupled to the first housing, the cap including a first lumen therethrough, the first lumen including a first end disposed at the inlet to the oil and air separator and a second end disposed at the first inner portion; wherein the second outer portion includes (i) an oil reservoir portion disposed below the barrier and first inner portion, and (ii) a vapor exit portion disposed above at least a portion of the barrier and above the oil reservoir portion; and wherein vapors residing in the vapor exit portion may exit the oil and air separator either: (i) to the atmosphere through a check valve coupled to the cap and extending therethrough, the check valve in fluid communication with the vapor exit portion and a breather that exhausts to the atmosphere; or (ii) a second lumen through the cap, the second lumen including a first end disposed at the vapor exit portion and a second end disposed at an outlet from the oil and air separator.

In alternate embodiments, the oil and air separator may be provided in combination with one or more of: (a) a sensor such as an air flow sensor, and (b) a PCV valve. In another embodiment, the first inner portion may include a coalescing filter material (e.g., steel wool).

Other benefits and advantages of the present disclosure will be appreciated from the following detailed description.

DETAILED DESCRIPTION

Embodiments of the invention and various alternatives are described. Those skilled in the art will recognize, given the teachings herein, that numerous alternatives and equivalents exist which do not depart from the invention. It is therefore intended that the invention not be limited by the description set forth herein or below.

One or more specific embodiments of the system and method will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Further, for clarity and convenience only, and without limitation, the disclosure (including the drawings) sets forth exemplary representations of only certain aspects of events and/or circumstances related to this disclosure. Those skilled in the art will recognize, given the teachings herein, additional such aspects, events and/or circumstances related to this disclosure, e.g., additional elements of the devices described; events occurring related to oil and air separation; etc. Such aspects related to this disclosure do not depart from the invention, and it is therefore intended that the invention not be limited by the certain aspects set forth of the events and circumstances related to this disclosure.

Figure 1:
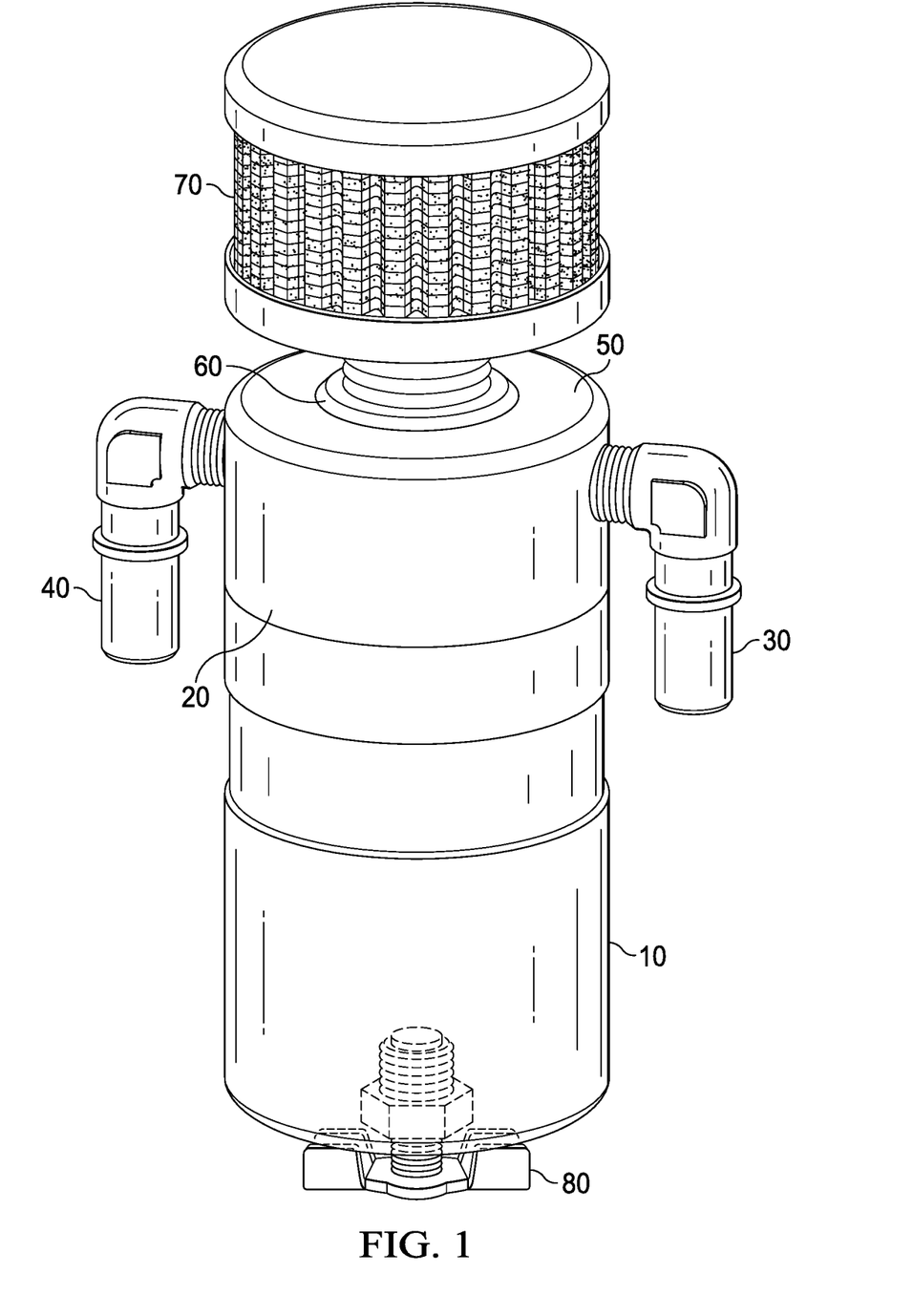
FIG. 1 is a perspective view of an exemplary oil and air separator system for combustion engine crankcase gases including a breather and check valve.

Turning now to the drawings, FIG. 1 shows an exemplary oil and air separator system for use in removing oil from combustion engine crankcase gases. The system includes a housing 10 removably coupled to a cap assembly 20. A quick release coupler 30 may be positioned at an inlet 35 to the oil and air separator system, and a quick release coupler 40 may be positioned at a first outlet 95 from the oil and air separator system. The cap assembly 20 may include a cap 50 and a check valve 60 attached to the cap 50 at an opening 65 in the top of the cap 50. A breather 70 may be removably coupled at a second outlet 45 from the oil and air separator system to the check valve 60, e.g., by a threaded engagement. The housing 10 may be equipped with a petcock 80 at the bottom of housing 10 at opening 310.

Figure 2:
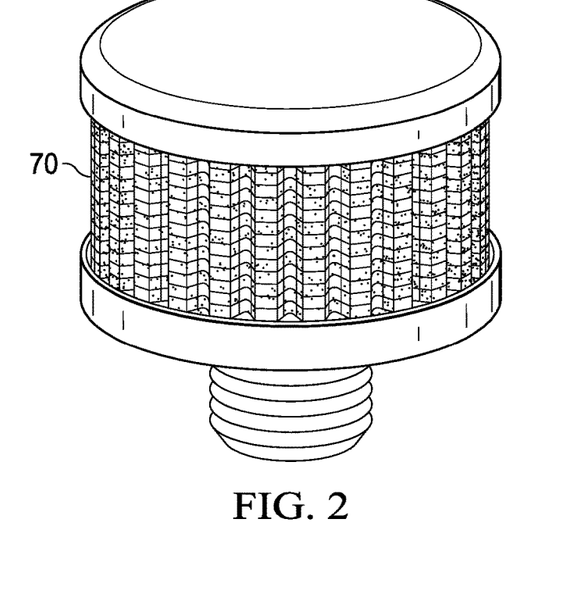
FIG. 2 is a perspective view of an exemplary embodiment of a breather device which may be used in the oil and air separator system shown in FIG. 1.
Figure 3:
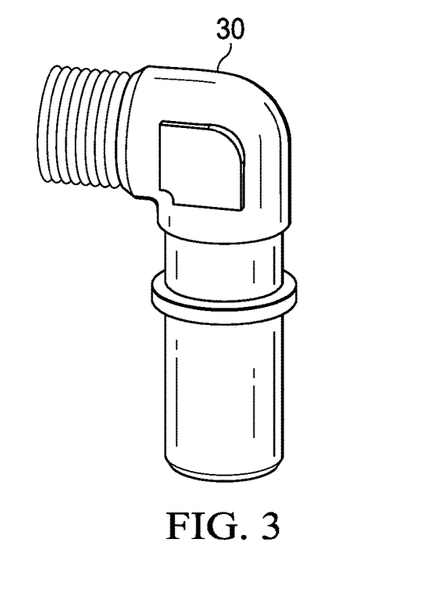
FIG. 3 is a perspective view of an exemplary quick-connect coupling which may be disposed at an inlet and/or at an outlet of the oil and air separator system shown in FIG. 1.
Figure 4A:
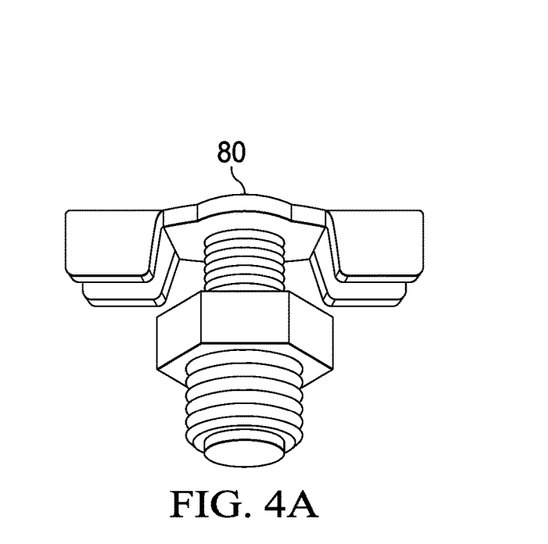
FIG. 4A is a perspective view of an exemplary embodiment of a petcock in an "open" configuration which may be used to drain oil from an internal oil reservoir of the oil and air separator system shown in FIG. 1.
Figure 4B:
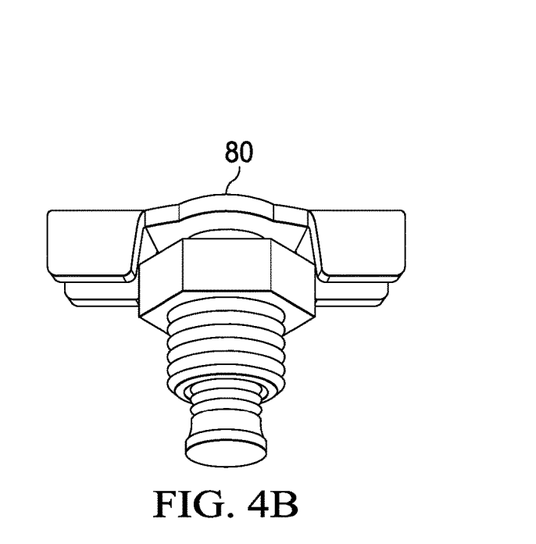
FIG. 4B is a perspective view of an exemplary embodiment of a petcock in a "closed" configuration which may be used to help hold oil in an internal oil reservoir of the oil and air separator system shown in FIG. 1.

The breather 70 is shown in FIG. 2. FIG. 3 illustrates quick release coupler 30, which may be the same type of part as quick release coupler 40. FIG. 4A illustrates the petcock 80 in a closed position. FIG. 4B illustrates the petcock 80 in an open position, which allows oil that accumulates in housing 10 to be drained via the petcock 80.

Figure 5:
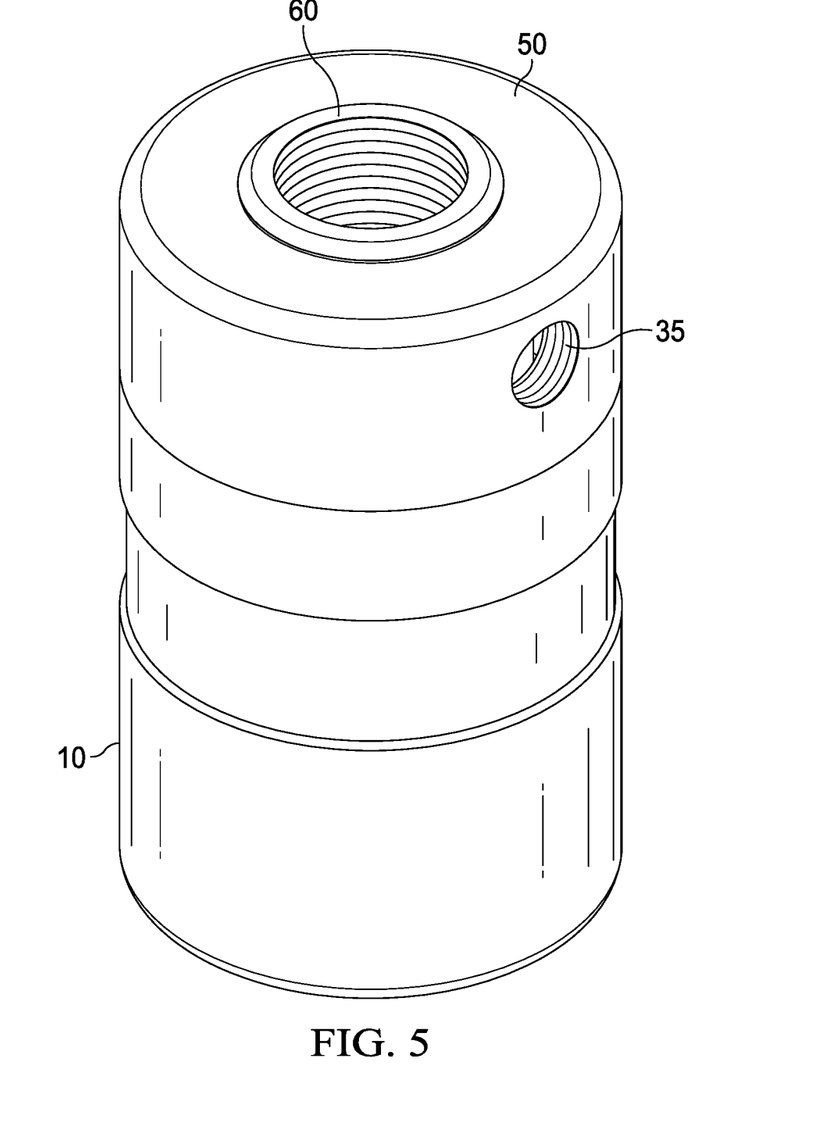
FIG. 5 is a perspective view of an exemplary cap assembly coupled to an exemplary housing of the oil and air separator system shown in FIG. 1.

FIG. 5 illustrates the housing 10 removably coupled to the cap 50. Check valve 60 is attached to the cap 50, e.g., by a press fit or by a threaded engagement. The cap 50 includes the inlet 35 to the oil and air separator system.

Figure 6:
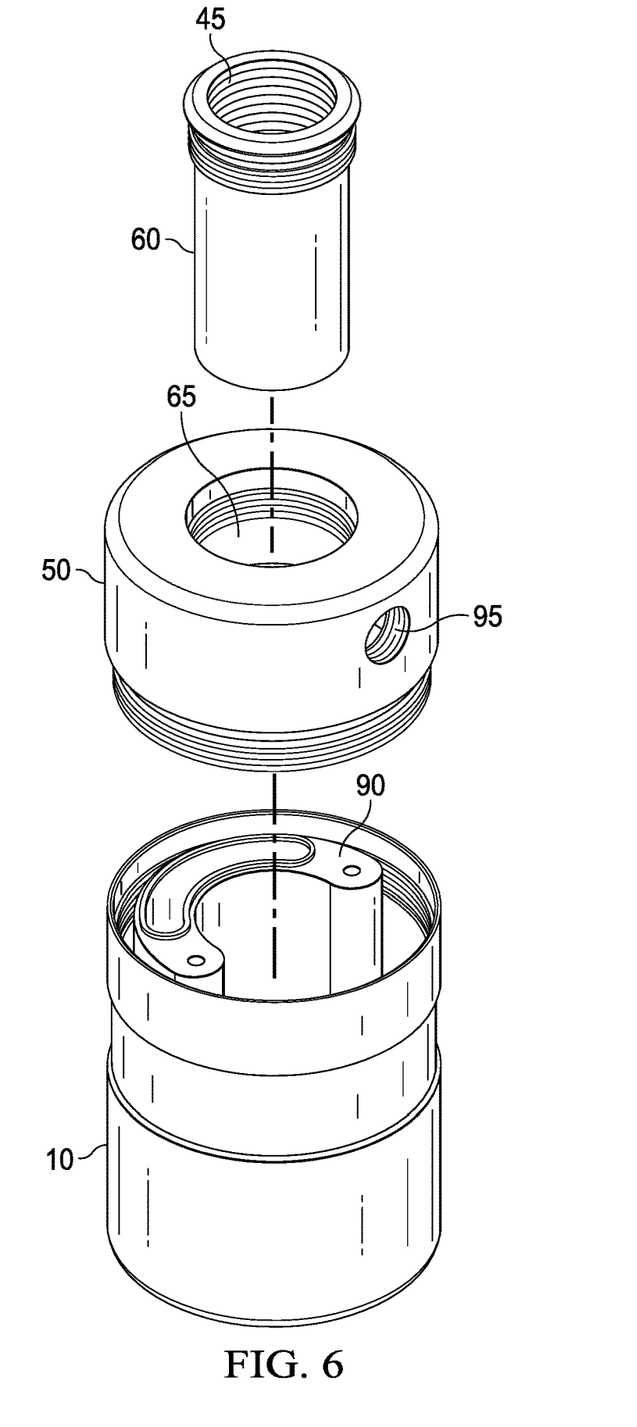
FIG. 6 is an exploded view of an exemplary cap assembly, including a cap and a check valve therethrough, and an exemplary housing, shown with an exemplary barrier disposed therein, of the oil and air separator system shown in FIG. 1.
Figure 7:
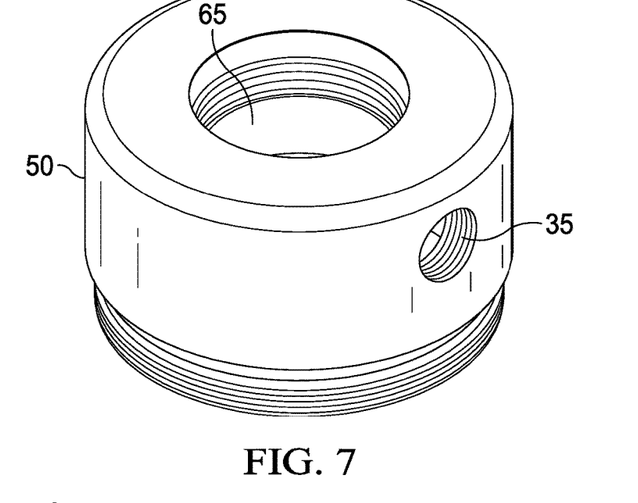
FIG. 7 is a perspective view of an exemplary cap that may be used with the oil and air separator system shown in FIG. 1.
Figure 8:
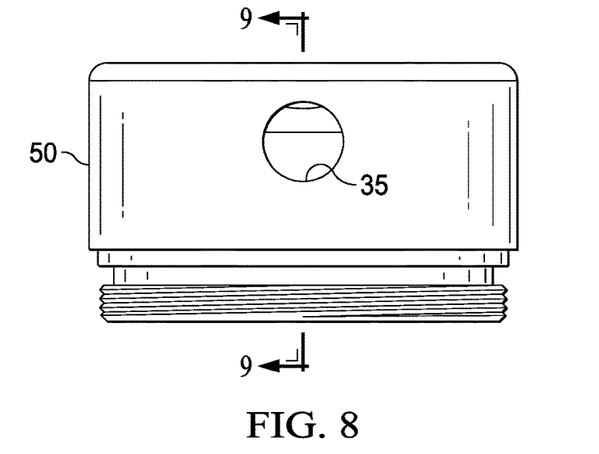
FIG. 8 is a side view of the exemplary cap shown in FIG. 7.
Figure 9:
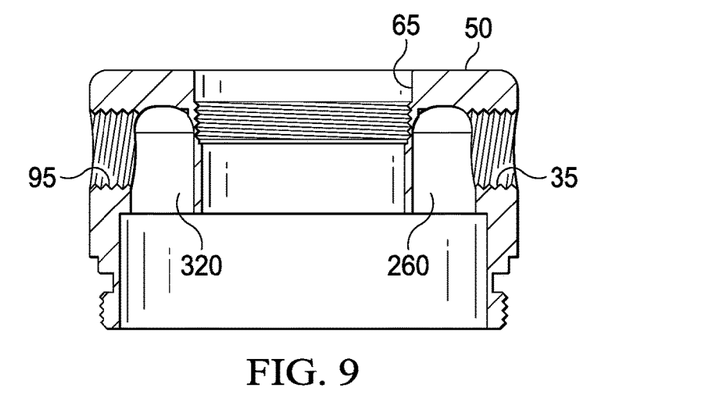
FIG. 9 is a cross-sectional view of the exemplary cap shown in FIG. 7 taken along the line 9-9 shown in FIG. 8.
Figure 10:
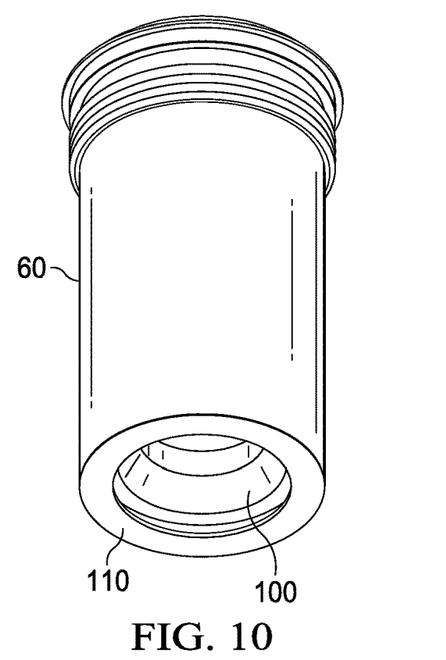
FIG. 10 is a perspective view from below of an exemplary check-valve body which may be used in oil and air separator system shown in FIG. 1.
Figure 11:
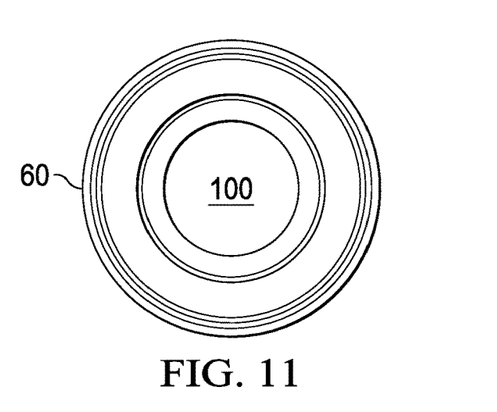
FIG. 11 is a bottom view of the exemplary check-valve body shown in FIG. 10.
Figure 12:
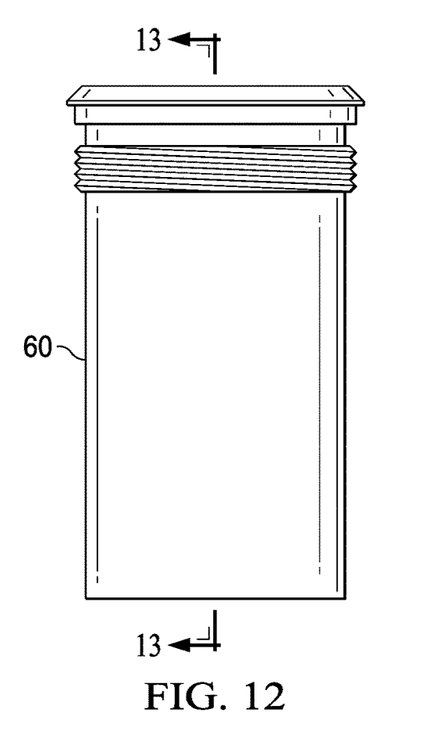
FIG. 12 is a side view of the exemplary check-valve body shown in FIG. 10.
Figure 13:
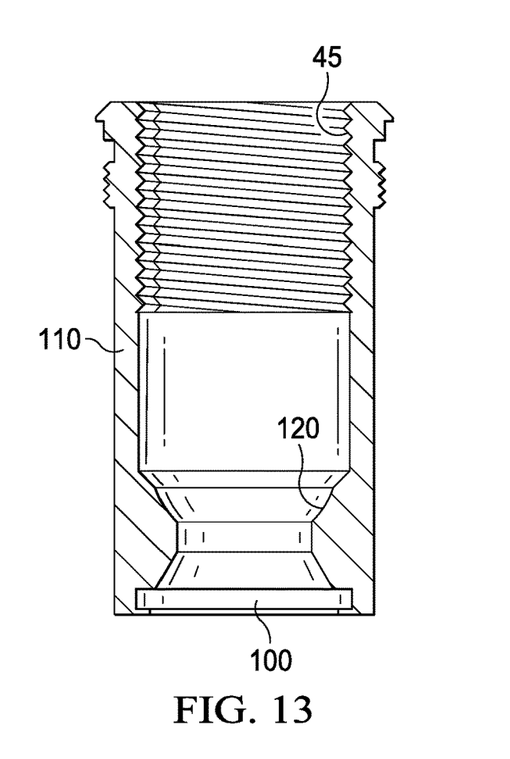
FIG. 13 is a cross-sectional view of the exemplary check-valve body shown in FIG. 10 taken along the line 13-13 shown in FIG. 12.
Figures 14, 15:
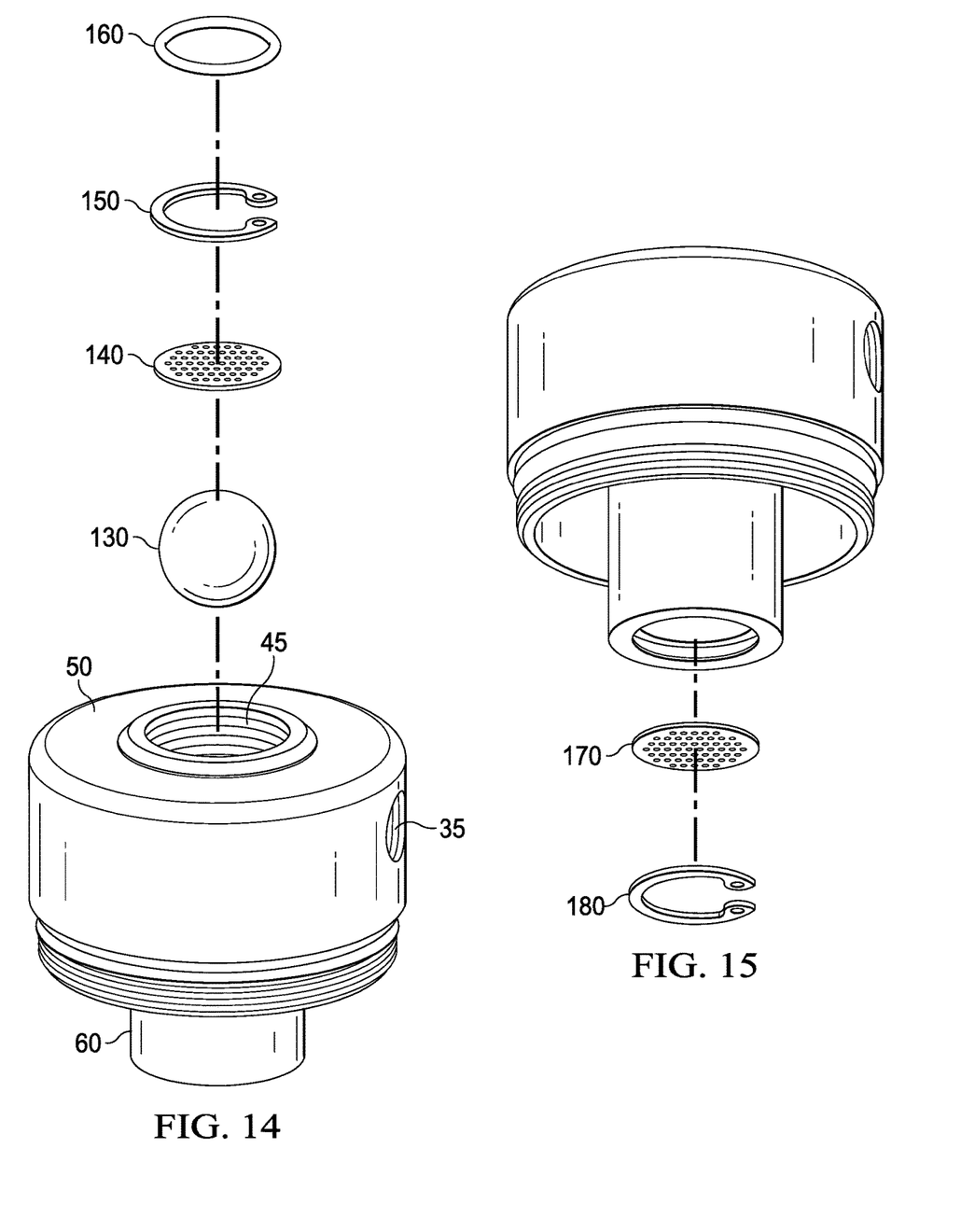
FIG. 14 is an exploded view of the cap assembly shown in FIG. 6, illustrating among other things the internal components of an exemplary check valve exitway for use in the oil and air separator shown in FIG. 1.
FIG. 15 is an exploded view of an exemplary entrance of an exemplary check valve which may be used in the cap assembly shown in FIG. 6.

FIG. 6 is an exploded view that shows the check valve 60, cap 50, and housing 10. Also shown is a barrier 90 which may be disposed within the housing 10. FIGS. 7-9 show additional details of an exemplary cap 50, including oil and air separator inlet 35, oil and air separator system first outlet 95, and the opening 65 within which the check valve 60 may be disposed. FIGS. 10-13 show additional details of an exemplary check valve 60. The check valve 60 includes inlet 100 at a first end of the body 110 of check valve 60; and outlet 45 at a second end of the body 110. A fluid pathway extends through the check valve 60 between the inlet 100 and the outlet 45. The body 110 includes along the fluid pathway a seat 120 for a ball 130. The ball 130 and other internal components of the check valve 60 are shown in the exploded views of FIGS. 14 and 15. The ball 130 rests against the seat 120 when the check valve 60 is closed. Relatively high pressure downstream of the ball 130 as compared to upstream of the ball 130 keeps the ball 130 pressed against the seat 120 to prevent the flow of fluids along the fluid pathway extending from outlet 45 to inlet 100. Conversely, when the pressure downstream of the ball 130 is less than the pressure upstream of the ball 130, then the ball 130 lifts off of the seat 120 and flow along the fluid pathway from inlet 100 to outlet 45 may occur. Downstream from the ball 130 within the body 110 of check valve 60 may be a screen 140, a retaining ring 150 to hold the screen 140 in place, and an o-ring 160 that helps provide a seal between the body 110 and the breather 70. Upstream from the seat 120 proximate the inlet 100 may be positioned a second screen 170 that is held in place by a retaining ring 180. Screens 140, 170 may act as coalescing filters to remove oil entrained in the vapors traveling along the fluid pathway from inlet 100 to exit 45.

Figure 16:
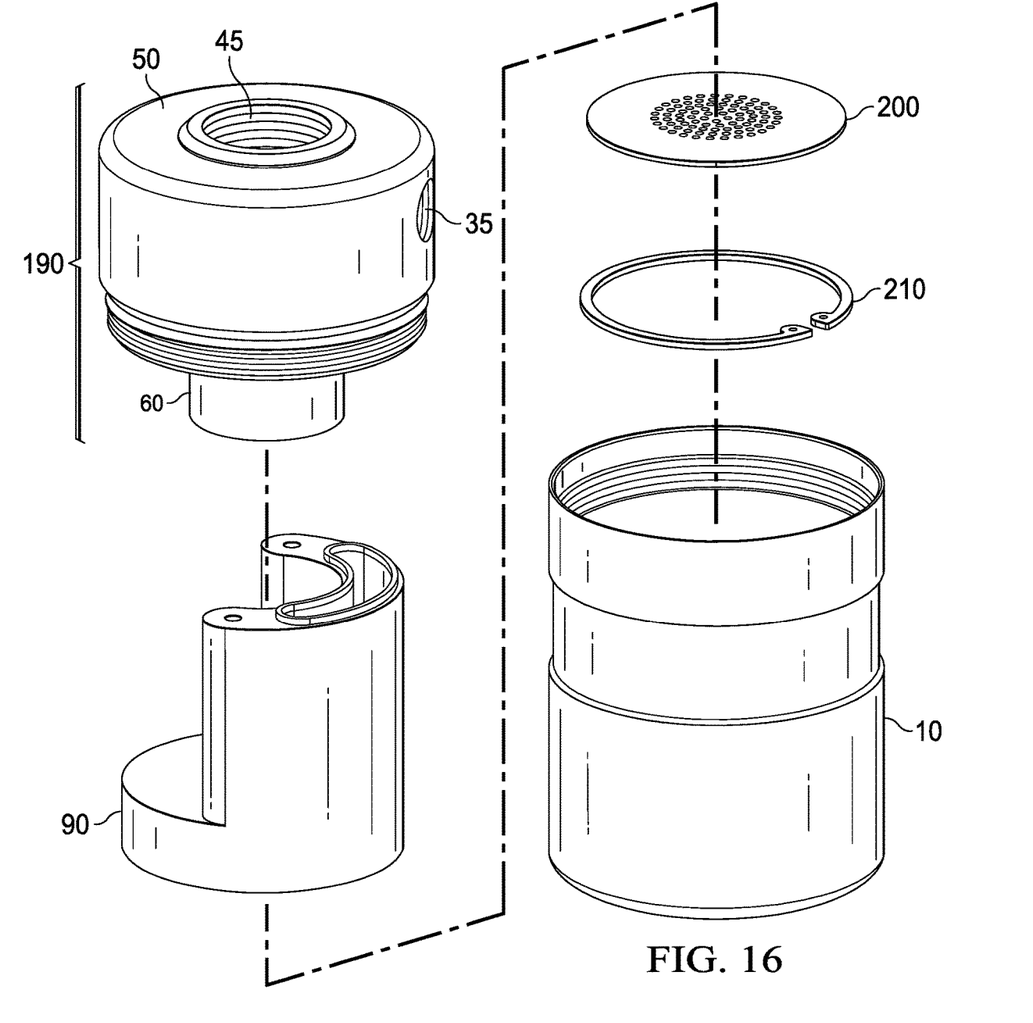
FIG. 16 is an exploded view of an exemplary cap assembly, barrier, screen, and housing which may be used in the oil and air separator shown in FIG. 1.
Figure 17:
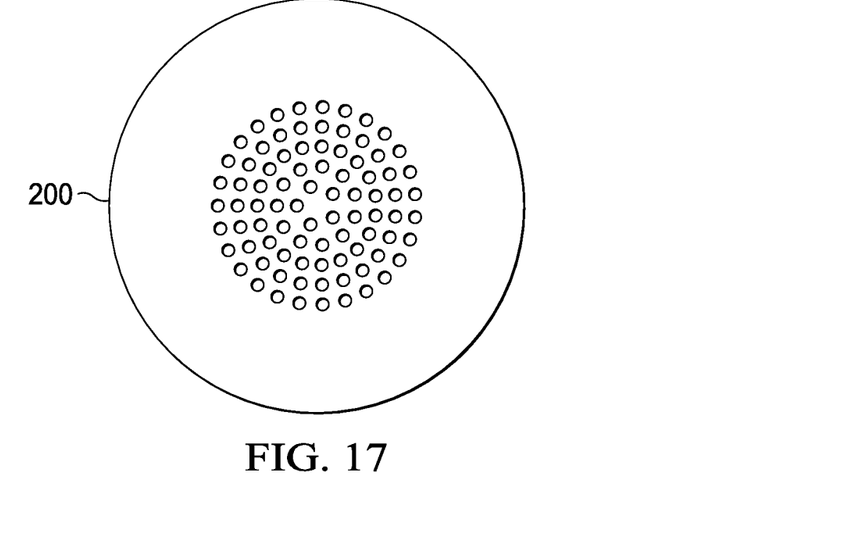
FIG. 17 is a bottom view of the exemplary screen shown in FIG. 16.
Figure 24:
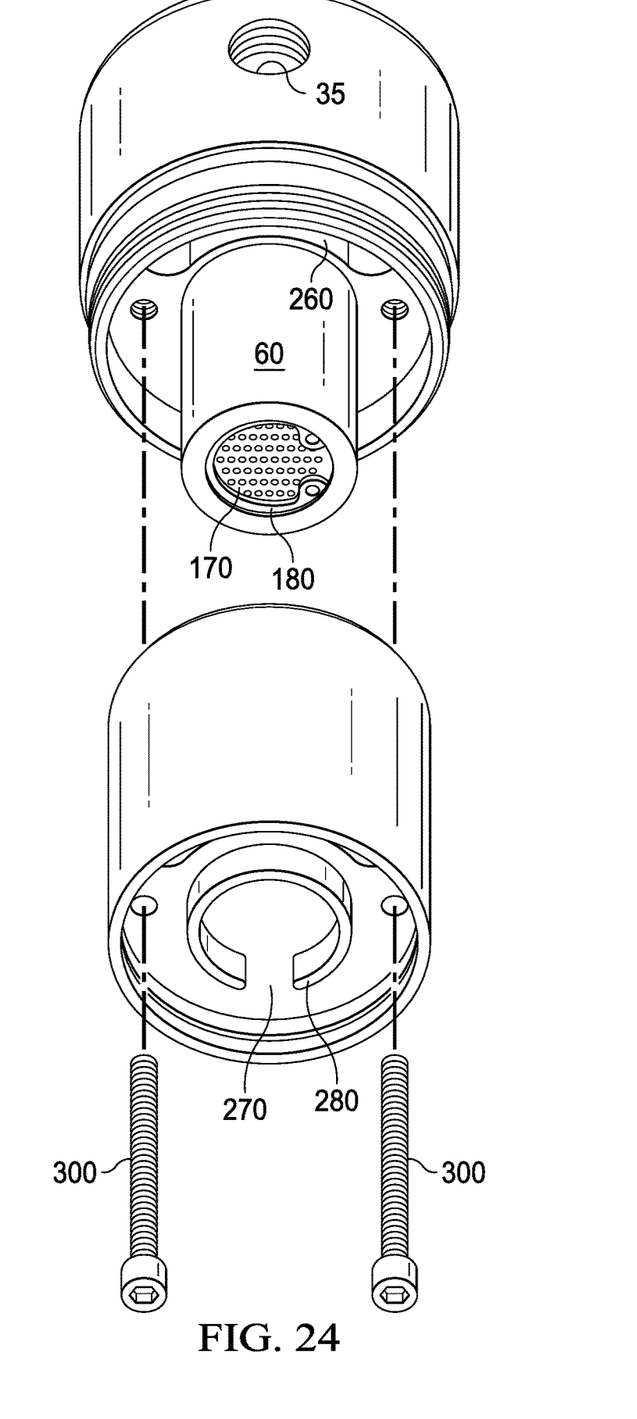
FIG. 24 is an exploded view illustrating the exemplary coupling of the barrier shown in FIG. 18 to the exemplary cap assembly shown in FIGS. 16, 23A, and 23B.
Figure 25:
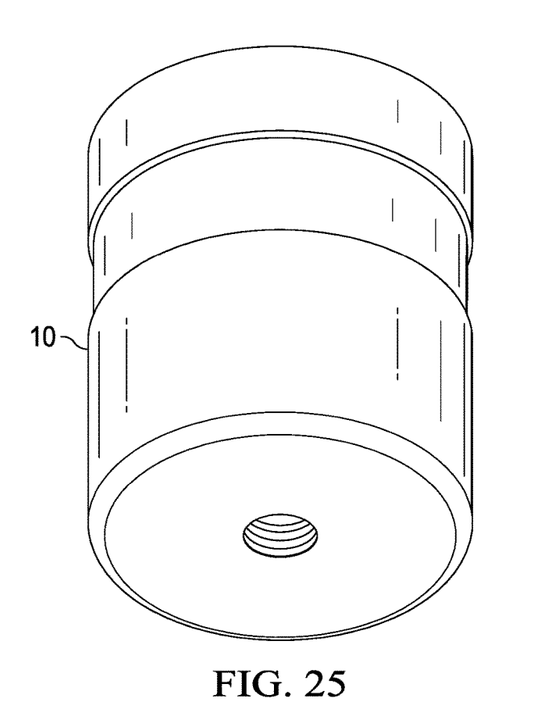
FIG. 25 is a perspective view from below of the exemplary housing shown in FIG. 16.
Figure 26:
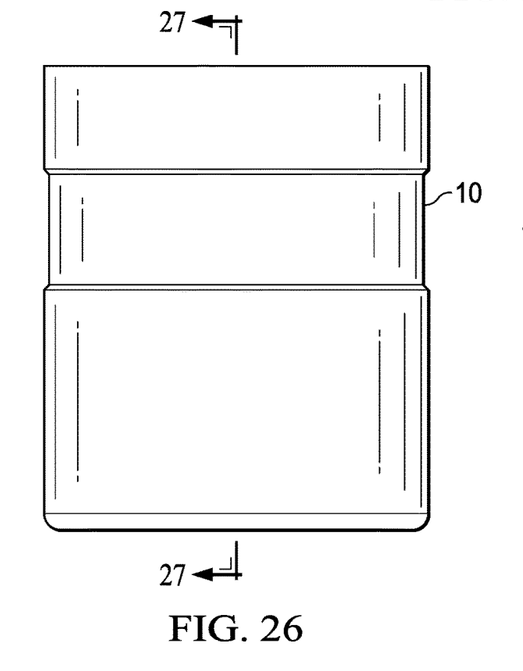
FIG. 26 is a side view of the exemplary housing shown in FIG. 25.
Figure 27:
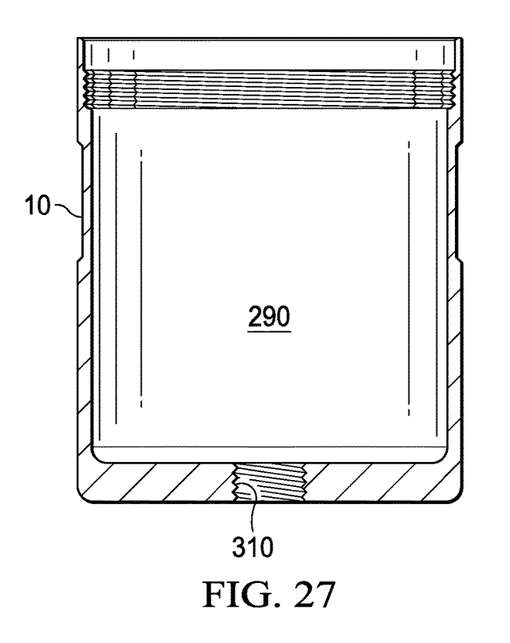
FIG. 27 is a cross-sectional view of the exemplary housing shown in FIG. 25, taken along the line 27-27 in FIG. 26.
Figure 28:
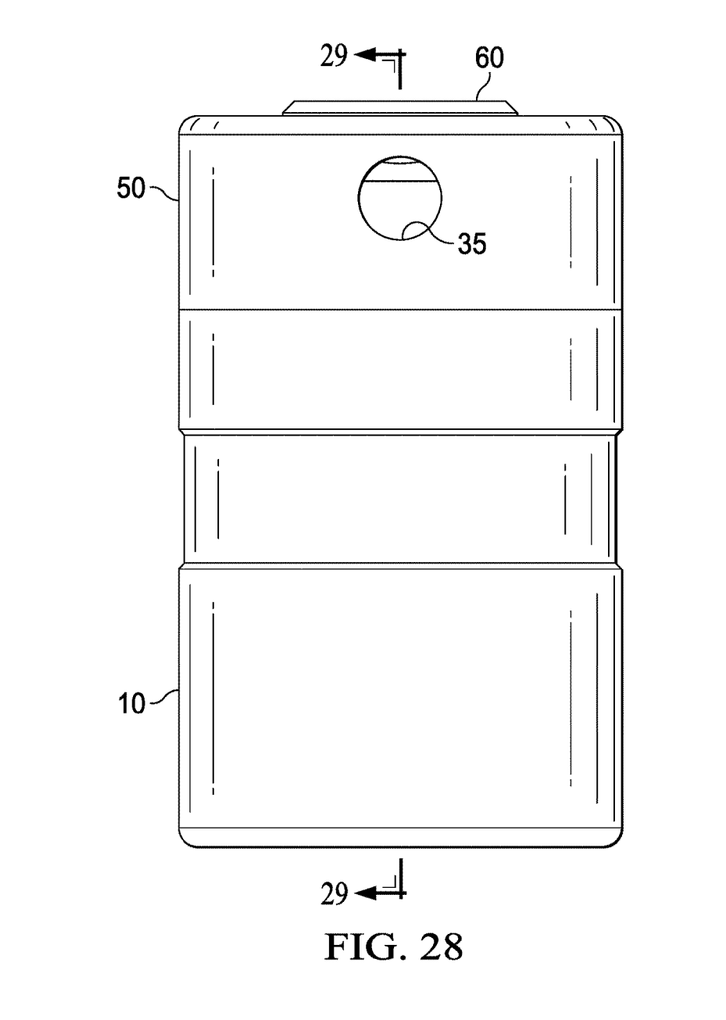
FIG. 28 is a side view illustrating an exemplary cap assembly shown in FIG. 16 removably coupled to an exemplary barrier and housing.
Figure 29:
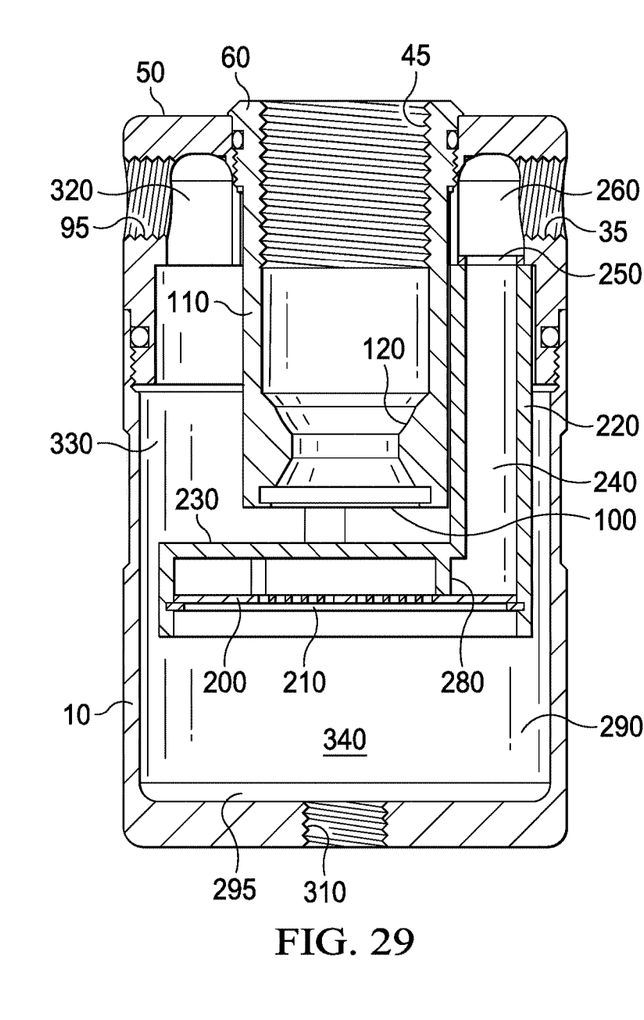
FIG. 29 is a cross-sectional view of the assembly shown in FIG. 28.

FIG. 16 is an exploded view that shows the cap assembly 190 (including the check valve 60 and cap 50) which may be removably coupled to the barrier 90 (see FIG. 24); and a screen 200 positioned at the bottom of the barrier 90 and held in place by a retaining ring 210. The cap assembly 190 is removably coupled, e.g., by threaded engagement, to the upper end of housing 10. An exemplary screen 200 is shown in FIG. 17. Additional details of the barrier 90 are shown in FIGS. 18-22.

Figure 18:
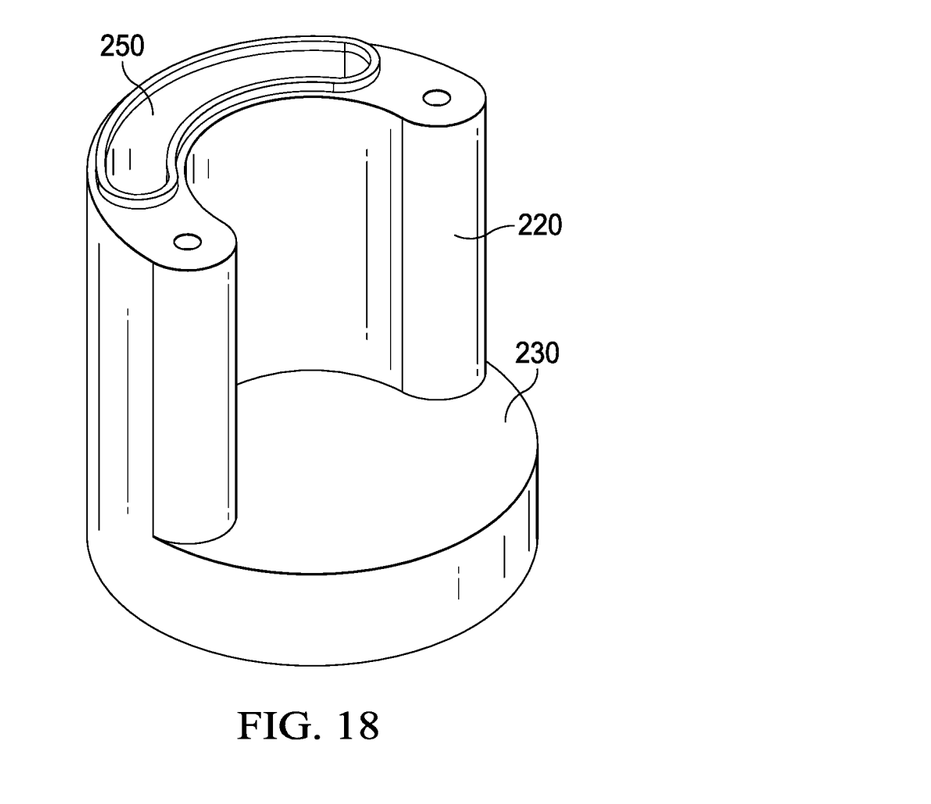
FIG. 18 is a perspective view of the exemplary barrier shown in FIG. 16.
Figure 19:
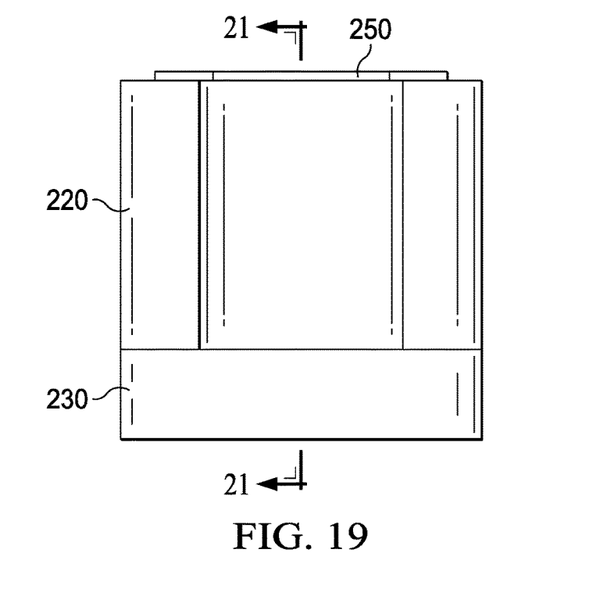
FIG. 19 is a side view of the exemplary barrier shown in FIG. 18.
Figure 20:
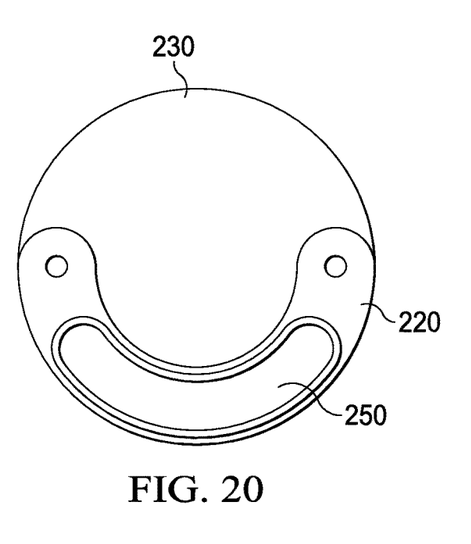
FIG. 20 is a top view of the exemplary barrier shown in FIG. 18.
Figure 21:
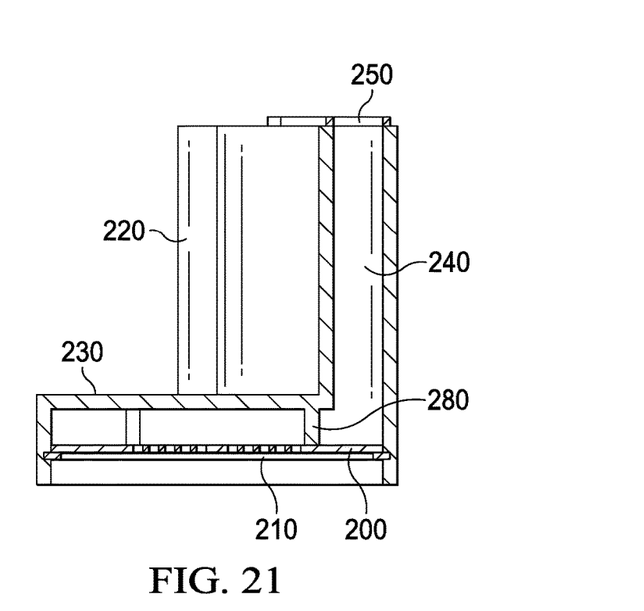
FIG. 21 is a cross-sectional view of the exemplary barrier shown in FIG. 18, taken along the line 21-21 shown in FIG. 19.
Figure 22:
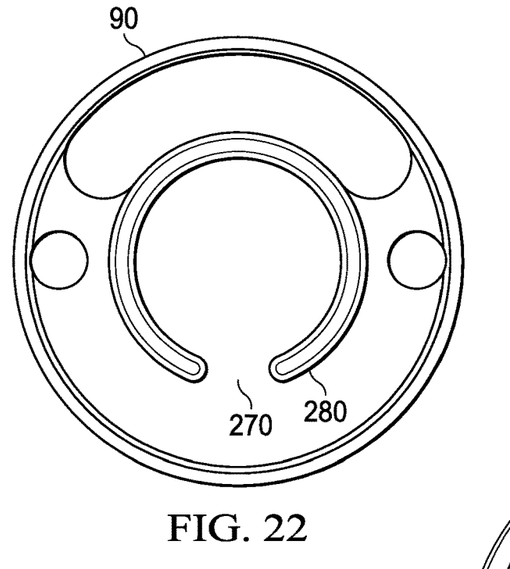
FIG. 22 is a bottom view of the exemplary barrier shown in FIG. 18.
Figure 23A:
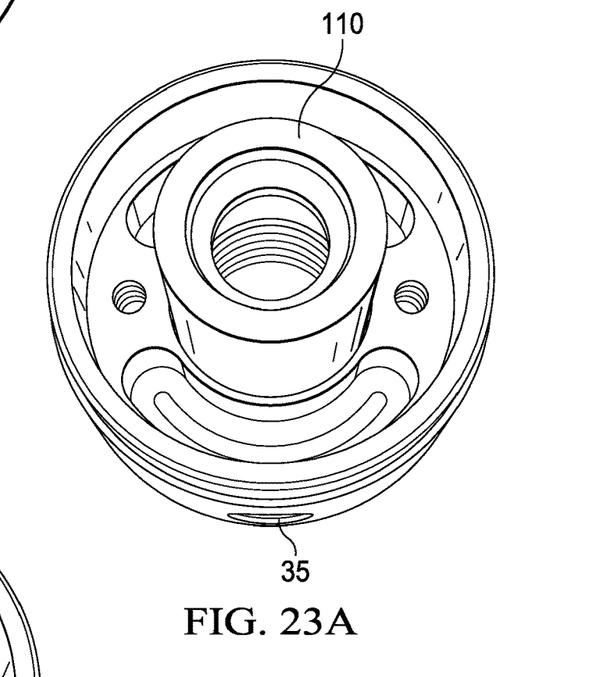
FIG. 23A is a perspective view from below of the exemplary cap assembly shown in FIG. 15.
Figure 23B:
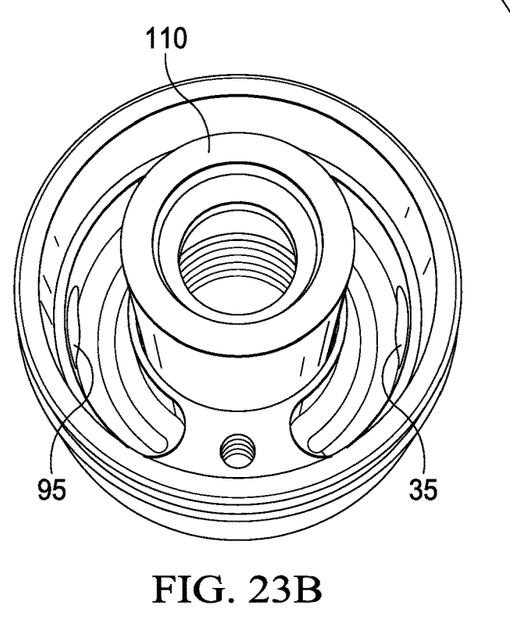
FIG. 23B is a perspective view from below of the exemplary cap assembly shown in FIG. 23A rotated about ninety degrees.

As shown in FIG. 18, the barrier 90 includes an upper portion 220 and a lower portion 230. The barrier 90 defines a space 240 (see FIG. 21). The space 240 includes inlet opening 250 that mates with the lumen 260 to form a continuous fluid pathway from inlet 35, through lumen 260, into the space 240. Fluids enter the space 240 at inlet opening 250. The fluids travel downward along the interior of upper portion 220 to the interior portion of the lower portion 230. Within the interior portion of lower portion 230, fluids are directed through opening 270 of wall 280. From that position generally within the confines of wall 280, the fluids may travel through screen 200, which may be held in place proximate the bottom of wall 280 by retaining ring 210, and into the bottom reservoir 290 of housing 10. Barrier 90 may be removably attached to the bottom of cap assembly 190 (shown in FIGS. 23A and 23B) using machine screws 300. See FIG. 24.

As shown in the drawings, the present disclosure in one embodiment provides oil and air separation systems and methods. In one exemplary embodiment, an oil and air separator includes: (a) a first housing 10 including a central chamber 290 therein, the central chamber 290 divided into a first inner portion 240 and a second outer portion 340 by a barrier 90; (b) a screen 200 and/or filter material disposed between the first inner portion 240 and the second outer portion 340; (c) a cap 50 directly removably coupled to the first housing 10, the cap 50 including a first lumen 260 therethrough, the first lumen 260 including a first end disposed at the inlet 35 to the oil and air separator and a second end disposed at inlet opening 250 of the first inner portion 240; wherein the second outer portion 340 includes (i) an oil reservoir portion 295 disposed below the barrier 90 and first inner portion 240, and (ii) a vapor exit portion 330 disposed above at least a portion 230 of the barrier 90 and above the oil reservoir portion 295; and wherein vapors residing in the vapor exit portion 330 may exit the oil and air separator either: (i) to the atmosphere through a check valve 60 coupled to the cap 50 and extending therethrough, the check valve in fluid communication with the vapor exit portion 330 and a breather 70 that exhausts to the atmosphere; or (ii) a second lumen 320 through the cap 50, the second lumen 320 including a first end disposed at the vapor exit portion 330 and a second end disposed at an outlet 95 from the oil and air separator.

The quick connect coupler 30 may be in fluid communication with an engine crankcase. The quick connect coupler 40 may be in fluid communication with a PCV valve and the engine's intake manifold. One or more pressure sensors may be disposed along any of the fluid pathways described herein.

In accordance with the present disclosure, an oil and air separator may be provided including: a catch can with an inlet and an outlet thereto, the catch can: (i) adapted to remove oil from vapors entering the catch can via the inlet, and (ii) including an internal reservoir within which oil from the vapors entering the catch can may collect; and a check valve including a first end disposed within the internal reservoir, a second end, and a first fluid pathway therebetween in fluid communication with the internal reservoir, wherein vapors within the internal reservoir may exit the catch can through the first fluid pathway or a second fluid pathway including the outlet. The second end of the check valve may be removably coupled to a breather in fluid communication with the first fluid pathway. A barrier may be provided to divide the internal reservoir into an inner space in fluid communication with the inlet and an outer space in fluid communication with the outlet and with the first fluid pathway, wherein the inner space is in fluid communication with the outer space via a path through a screen disposed between the inner space and the outer space.

It should be understood that the foregoing description is only illustrative of the invention. Various alternatives and modifications can be devised by those skilled in the art having the benefit of this disclosure, without departing from the invention. Accordingly, the invention is intended to embrace all such alternatives, modifications and variances.

Certain exemplary embodiments of the disclosure may be described. Of course, the embodiments may be modified in form and content, and are not exhaustive, i.e., additional aspects of the disclosure, as well as additional embodiments, will be understood and may be set forth in view of the description herein. Further, while the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention.

What is claimed is:

1. An oil and air separator including:
   (a) a first housing including a central chamber therein, the central chamber divided into a first inner portion and a second outer portion by a barrier;
   (b) a screen disposed between the first inner portion and the second outer portion;
   (c) a cap directly removably coupled to the first housing, the cap including a first lumen therethrough, the first lumen including:
      (i) a first end disposed at an inlet to the oil and air separator, and (ii) a second end disposed at the first inner portion; wherein the second outer portion includes:

(x) an oil reservoir portion disposed below the barrier and the first inner portion, and (y) a vapor exit portion disposed above at least a portion of the barrier and above the oil reservoir portion;

wherein vapors residing in the vapor exit portion may exit the oil and air separator either:

(j) to the atmosphere through a check valve coupled to the cap and extending therethrough, the check valve in fluid communication with the vapor exit portion and a breather that exhausts to the atmosphere; or (k) through a second lumen through the cap, the second lumen including a first end disposed at the vapor exit portion and a second end disposed at an outlet from the oil and air separator.

2. An oil and air separator including:

(a) a catch can with an inlet and an outlet thereto, the catch can: (i) adapted to remove oil from vapors entering the catch can via the inlet, and (ii) including an internal reservoir within which oil from the vapors entering the catch can may collect; and (b) a check valve including a first end disposed within the internal reservoir, a second end, and a first fluid pathway therebetween in fluid communication with the internal reservoir, wherein vapors within the internal reservoir may exit the catch can through the first fluid pathway or a second fluid pathway including the outlet.

3. The oil and air separator of claim 2, wherein the first end of the check valve is disposed within the internal reservoir, and wherein the second end of the check valve is removably coupled to a breather in fluid communication with the first fluid pathway.

4. The oil and air separator of claim 3, wherein the check valve includes a ball that, when pressure at the second end is greater than pressure at the first end, bears upon a seat to prevent flow along the first fluid pathway from the second end to the first end.

5. The oil and air separator of claim 3, wherein vapors within the catch can may be vented to the atmosphere via the first fluid pathway and the breather.

6. The oil and air separator of claim 2, wherein the catch can includes one or more screens that coalesce oil from vapors entering the catch can.

7. The oil and air separator of claim 2, wherein a barrier divides the internal reservoir into an inner space in fluid communication with the inlet and an outer space in fluid communication with the outlet and with the first fluid pathway, wherein the inner space is in fluid communication with the outer space via a path through a screen disposed between the inner space and the outer space.

8. The oil and air separator of claim 7, wherein a wall is positioned within the inner space to help direct through the screen the vapors entering the catch can.

9. The oil and air separator of claim 7, wherein the screen is disposed at a bottom of the inner space.

10. The oil and air separator of claim 9, wherein the screen is removably coupled to the barrier using a retaining ring.

11. The oil and air separator of claim 10, wherein the catch can includes a housing removably coupled to a cap, the cap including the inlet, the outlet, and the check valve therethrough.

12. The oil and air separator of claim 11, wherein the barrier is coupled to the cap.

\* \* \* \* \*